May 11, 1943.  C. HALMRAST  2,319,128
CUTTING MACHINE
Filed Nov. 13, 1941  3 Sheets-Sheet 1

Inventor
Carl Halmrast
By: Ralph Burch
Attorney

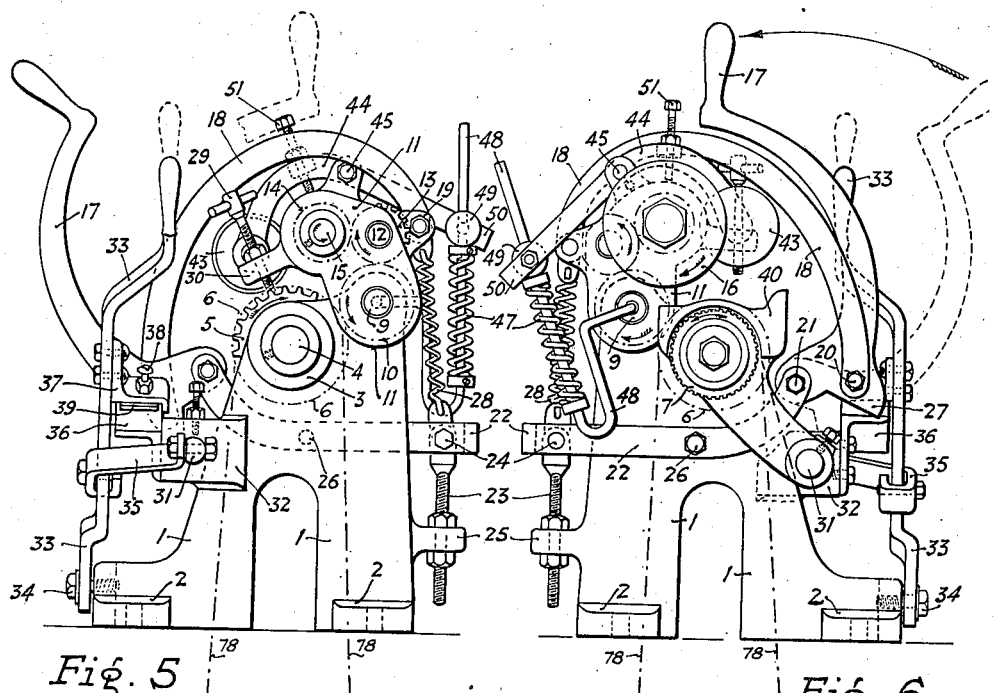
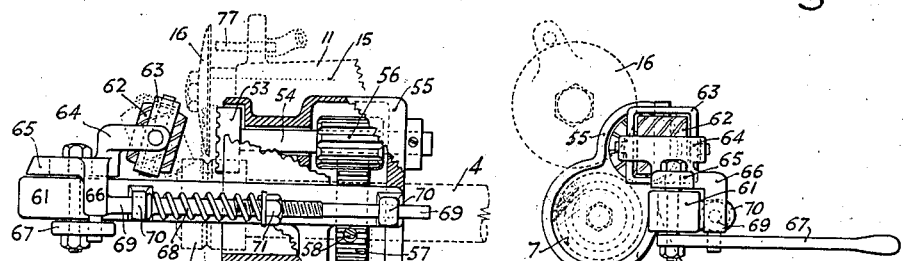
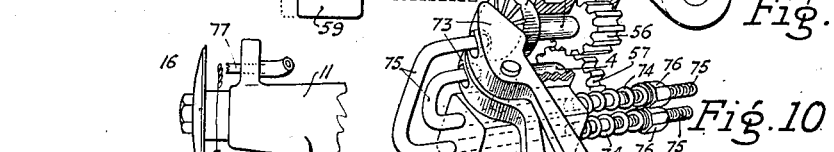

May 11, 1943.  C. HALMRAST  2,319,128
CUTTING MACHINE
Filed Nov. 13, 1941   3 Sheets-Sheet 3

Inventor
Carl Halmrast
By: Ralph Burch
Attorney

Patented May 11, 1943

2,319,128

UNITED STATES PATENT OFFICE 2,319,128

CUTTING MACHINE

Carl Halmrast, Vancouver, British Columbia, Canada

Application November 13, 1941, Serial No. 418,968

13 Claims. (Cl. 164—61)

My invention relates to new and useful improvements in cutting machines, used as means to cut fabrics, composition materials, rubber, and the like, of various thicknesses, into strips of various widths; and more particularly for the purpose of recovering or salvaging rubber from pneumatic tires, wherein the tires are cut into strips, and the strips, so cut, split, or the rubber parted therefrom by a splitting action.

An object of my invention is to provide a novel device adapted to perform more than one function by means of interchangeable attachments, in order to obviate the necessity of using separate machines for separable purposes. Other objects of my invention are, to provide a cutting machine having simple controlling means which permit quick adjustments while in operation; positive locking and releasing means for the purpose of safety to the operator; and generally, to provide a machine sturdy in construction, compact in form, comprising parts readily accessible for inspection and repair and which will adequately and effectively perform the functions required of it.

My invention is a cutting machine of the rotary blade type, power driven by a prime mover separate from the device proper; consisting principally of a driver mandrel adapted to feed the material to be cut to a rotary cutting blade, gear driven through a floating gear train geared in turn to the mandrel; all suitably mounted to a base forming the frame and having operational appurtenances mechanically related thereto, to comprise a homogeneous and integral unit.

Heretofore the process of salvaging and recovering rubber from pneumatic tires has been attained by an operation involving much handling of material, some of the most common, and previously most economical methods being to pare or strip the rubber from the tire by shearing with machines that are limited in scope; and likewise with the beads of tires, where the bead has first to be annularly incised to the depth of the stiffening wire embedded in the bead, and the wire subsequently torn or ripped therefrom, before the rubber can be reclaimed; all of which require separate machines with consequent high cost and low percentage of material recovered.

Whereas my invention, as a single unit, performs the multiple functions, which are at present necessary for want of better known means, in salvaging rubber from pneumatic tires by debeading the tire and cutting the side walls and face or tread into continuous strips of various and any desired width; after which, the strips, so cut, are re-fed to the same cutting blade by means of a splitting attachment and the rubber consequently split from its fabric base with a degree of accuracy heretofore unattainable, and a resultant higher percentage of recovery.

Such are the nature and objects of my invention, the preferred embodiment of which will be more readily understood by reference to the following specification and drawings accompanying, forming part of this application, and in which:

Figure 5 is an end elevation of the device viewed from the end opposite the cutter head end, wherein the gear train is shown by dot and dash lines on the pitch diameters of the gears, and in which lever movement is also indicated, the progression being shown in Figure 6.

Figure 6 is an end elevation viewed from the cutter head end, wherein lever movement, indicated by an arrow, has placed the machine in open or disengaged position.

Figure 7 is an end elevation of a splitting attachment adapted to be mounted on the cutting end of the machine as indicated in dotted outline in Figure 8.

Figure 8 is a side or front view of the splitting attachment shown mounted on the machine whose fragmentary parts are indicated in dotted outline as noted in the reference to Figure 7.

Figure 9 is a fragmentary view similar to Figure 8 for the purpose of illustrating the operation of the splitting attachment; wherein is shown, a cut strip of tire on edge ready to be fed through the machine and split by the rotary cutter blade. In this view the strip of rubber is unconventionally illustrated, representing the rubber in solid black and the fabric in stipple, all for the purpose of clarity.

Figure 10 is a fragmentary oblique view showing alternative means for part of the splitting atattachment, wherein spring-actuated lever-dogs are used.

Figure 12:
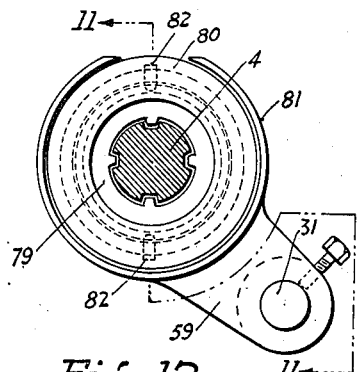
Figure 11:
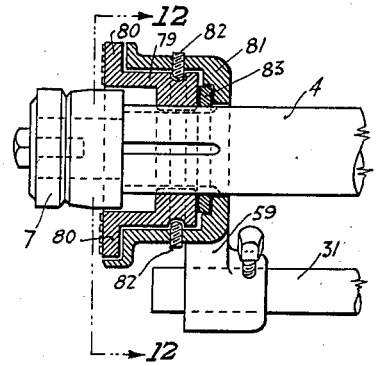

Figure 11 is a part sectional side view on the line 11—11 of Figure 12 showing an alternative auxiliary feed member for the splitting attachment.

Figure 12 is an end view on the line 12—12 of Figure 11 with the feed roller 7 omitted.

Figure 13:
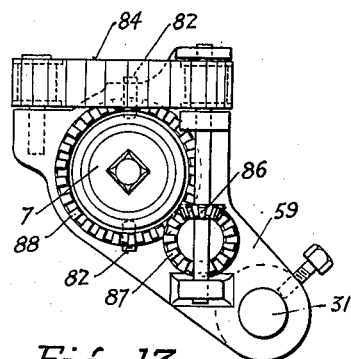
Figure 14:
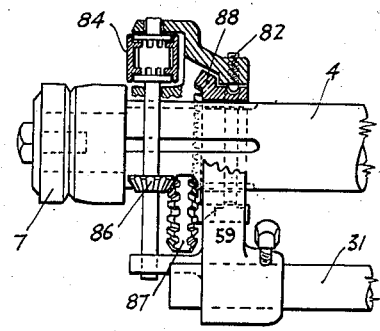

Figures 13 and 14 show further alternative means in an auxiliary feed member; Figure 13 being an end elevation similar to Figure 12, and Figure 14 being a part sectional side view similar to Figure 11.

Like numerals refer to like parts throughout the several views.

Referring to the drawings:

The standards 1, with anchoring cleats 2, constitute the base of the machine, having bearings 3, integral therewith, in which rotates a mandrel 4, having mounted thereon: a driver sprocket wheel 5, a transmission spur gear 6, and a feed roller 7, characterized by a milled or knurled face, for the purpose of imparting traction to the material being cut, an annular V-shaped groove and a tapering face of a distance less than the full face, adjacent said annular groove.

The numerals 8, indicate hinge bearings, integral with the standards 1, as means to support a shaft 9, upon which is mounted a cog wheel 10, in meshed engagement with the spur gear 6, and said shaft 9, further adapted to support in hinged engagement therewith a housing 11, in which reposes a gear train comprising a shaft 12, supporting a pinion wheel 13, in meshed engagement with a pinion wheel 14, through which passes a cutter blade shaft 15, said housing and gear train as a unit, adapted to movement through an arc co-axial with said shaft 9.

The gear wheels 6, 10, 13 and 14, comprise the transmission from the driver mandrel 4, to the cutter blade shaft 15, with all gears remaining in permanent meshed engagement.

Engagement and disengagement of the cutting blade, hereinafter referred to, with the feed roller 7, is attained by means of the hinged action of the housing 11, supporting the cutter blade on the shaft 15, now referred to as the rotary cutter blade 16, which swings pivotally through the arc, hereinbefore described, concentric with the shaft 9, and simultaneously with said housing 11.

A lever 17, with a connecting link 18, flexibly secured to lugs 19, upon the housing 11, provides the means to actuate in engaging and disengaging movement the unit supporting the cutting blade 16, said lever adapted to automatic locking action by means of an offset pivotal point 20 (Figure 6) to which is secured the link 18, upon said lever 17, said pivotal point 20, adapted to pass through an arc concentric with the fulcrum 21, of the lever and to pass beyond dead centre as described by a line drawn through the link connection at the lugs 19, the fulcrum point 21, and the pivotal point 20; the point of reach beyond dead centre, so described, being attained when the lateral extension 27 (Figure 6) of the lever 17 comes in contact with the slide bar 31, hereinafter referred to. The lever 17, is fulcrumed at a point 21, upon a rocking fork 22, adapted to adjustment by means of an adjusting bolt 23, secured in pivotal engagement with said rocking fork by a pin bolt 24, adjustably anchored to a lug 25, integral with one of the standards 1, of the base of the machine; the rocking fork being, in turn, pivotally fulcrumed upon said standard 1, by means of a pin bolt 26, all for the purpose of providing adjustment to compensate for wear upon the rotary cutter blade and a greater or lesser clearance between the cutter blade and the feed roller without nullifying the locking ability of the operating lever 17, and to prolong the usability of the cutter blade.

Gravitational pull upon the hinged housing member 11, with its various components, including the cutter blade, as hereinbefore recited, is prevented by means of a coil tension spring 28, interposed between and secured to the lugs 19, of said housing and the pin bolt 24, of said rocking fork 22, as means to hold the cutting member clear of the feed roller while in the disengaged position during operation, and as means to safeguard the operator by preventing inadvertent engagement during adjustment of the machine.

The numeral 29 indicates a set screw adapted to adjustment in a lug 30, integral with the housing 11, as means to prevent abrasive contact of the rotary cutter upon the feed roller.

The numeral 31 indicates a slide bar, previously referred to as stopper means for the lever 17, adapted to slidable action through brackets 32, integral with the standards 1, said slide bar being actuated by a lever 33, fulcrumed at a point 34, upon the base of the machine and having an offset connecting link 35, connecting said lever to said slide bar.

36 represents a friction plate upon which a breaker member 37, in fixed connection with a lever 33, slides in breaking engagement, as means to control the movement of said lever 33, and also to provide quick action in such movement by the operator while the machine is in operation for the purpose of varying the widths of the strips of material being cut.

The degree of friction necessary on the friction plate is attained by adjustment of a set screw 38, in threaded engagement with the breaker member 37, adapted to expand a break shoe 39, against the friction plate 36. Movement of the lever 33, by reason of its connection to the slide bar 31 actuates a gauge 40, in slidable engagement with the mandrel 4, said gauge 40, adapted to be variably positioned upon said slide bar and held thereon in predetermined fixed position by means of a set screw 41, said gauge 40, being the means to alter and gauge the widths of the strips of material being cut. A gauge extension 42, removably attached to the gauge 40, provides the means, by its removal, whereby the side wall of a pneumatic tire may be cut therefrom in a single strip.

The numeral 43, indicates a spring-actuated pressure-roller rotatably mounted to a yoke 44, pivotally secured to the housing 11, by means of pin bolts 45, anchoring in lugs 46, integral with said housing, said pressure roller adapted to exert pressure upon and hold material to be cut against the feed roller 7, and said pressure roller 43, characterized by a tapered face adapted to suit the corresponding tapered portion of the face of the feed roller 7.

Pressure of the roller 43, is attained by means of a coil spring 47, mounted upon an offset guide rod 48, the offset terminus of which, anchors in the recessed end of the hinge shaft 9, and the other terminus of which passes in sliding engagement through a bolster bolt 49, pivotally secured to the lever terminus 50, of the yoke 44; over-reaching movement of said yoke being controlled by means of a set screw 51, in threaded engagement with a lug 52, integral with said yoke.

Figures 7, 8 and 9 indicate a splitting attachment adapted to be positioned upon the machine in fashion similar to the gauge member 40, hereinbefore described. In the splitting operation the gauge member would be dispensed with, as the splitting attachment is adapted to perform that function among others.

The numeral 53, indicates an auxiliary feed roller having a radially serrated side adjacent to the rotary cutter 16, mounted upon a shaft 54, bearing in a housing 55. Fixed upon the shaft 54, is a pinion gear 56, adapted to meshed engagement with a spur gear 57, variably positioned in fixed engagement upon the mandrel 4, by means of a set screw 58, as means to rotate said auxiliary feed roller.

The housing 55, has an arm 59, adapted to engagement upon the slide bar 31, variably fixed thereto by a set screw 60, as means to operate said splitting attachment as a gauge similar to the dispensed with gauge 40.

A sill 61, integral with the housing 55, acts as supporting means for an auxiliary pressure roller unit, comprising a spirally or annularly ribbed or fluted roller 62, rotatably mounted to a box-bearing 63, pivotally secured to a spring actuated yoke 64, having a base 65, in sliding engagement with the sill 61, and an offset lateral arm 66, adapted to pivotal engagement with a lever 67, fulcrumed upon said sill 61, as means to operate the roller 62, in engaging and disengaging movement.

A coil spring 68, mounted upon a guide rod 69, integral with the offset arm 66, supported by lugs 70, integral with the sill 61, exerts pressure against an adjustment nut 71, in threaded adjustable engagement with the rod 69, and one of the lugs 70, as means to impart pressure through the roller 62, to the material being split, for the purpose of preventing the material from folding or being squeezed vertically by the rotary cutter blade and nullifying the splitting action.

Cut strips of tire vary in thickness of fabric and thickness of rubber, and some of the strips in cross-section have converging or tapering faces; for this reason the auxiliary pressure roller is pivotally mounted to a yoke as a means to impart equalized pressure to the sloped surface, as shown in Figure 9.

In Figure 7, the pressure roller 62 is shown with its rotating axis in vertical alignment for the purpose of clarity; the preferred embodiment being, to have the rotating axis tangent to the cutting blade and the pivotal axis of the yoke supporting said roller lying in radial alignment to the cutting blade, whereby pressure exerted by the roller upon the material being cut will be uniform and substantially normal to the cutting arc described by the cutting blade, and the spiral or annular ribbing or fluting of the roller would have a tendency to impart horizontal traction across the feed roller to offset lifting movement caused by the pressure roller when mounted at the skew angle described.

Figure 10 shows an alternative to the auxiliary pressure roller 62, wherein spring-actuated lever-dogs 73, fulcrumed to the sill 61, are used instead of the roller 62, as means to provide pressure. The dogs 73 exert pressure by means of coil springs 74 mounted upon offset guide rods 75 bearing in the sill 61; the guide rods engaging with said dogs, and pressure adjusted by means of nuts 76 in threaded engagement with said guide rods.

Figures 11 and 12 show an alternative to the auxiliary feed roller 53 of the splitting attachment, wherein a recessed hub 79 having a flange 80 is slidably mounted upon the mandrel 4, the recess having a diameter greater than the feed roller 7 for the purpose of slidable movement endwise in a telescopic fashion, as means to gauge splitting widths. The recessed hub is held in rotatable engagement with a housing 81 integral with an arm 59 by means of race pins 82 in threaded engagement with the housing and seating in an annular groove upon the periphery of said recessed hub. The numeral 83 indicates a thrust bearing interposed between the housing 81 and the flanged and recessed hub 79.

Figures 13 and 14 show a further alternative to the auxiliary feed roller 53 and the recessed hub 79 with the flange 80, wherein a flexible track 84, as traction and gauging means, is mounted in bearings integral with a housing 85 and the arm 59, geared to the mandrel 4 by means of a bevel gear 86 in meshed engagement with a crown gear 87 in turn geared to a bevel gear 88 slidingly splined to the mandrel and held in engagement with the housing 85, by race pins 82, in fashion similar to the recesed hub, hereinbefore described.

The alternatives to the splitting attachment as shown by Figures 11 to 14 inclusive, are adapted to any combination with the auxiliary pressure means comprising the spring-actuated lever-dogs or the pivotally mounted roller. The members so described are separately illustrated to avoid confusion, but the combinations anticipated are readily discernible and the adoption of one or any of such combinations constitutes a constructional modification coming within the scope of the invention.

The numeral 77 indicates a nozzle passing through one of the lugs 46, trained upon the rotary cutter blade, adapted to have secured thereto a hose for the purpose of spraying water upon said blade to facilitate the cutting of rubber in particular, and the numeral 78 diagrammatically represents flexible connection to a prime moving element as means to operate the machine.

Figure 1:
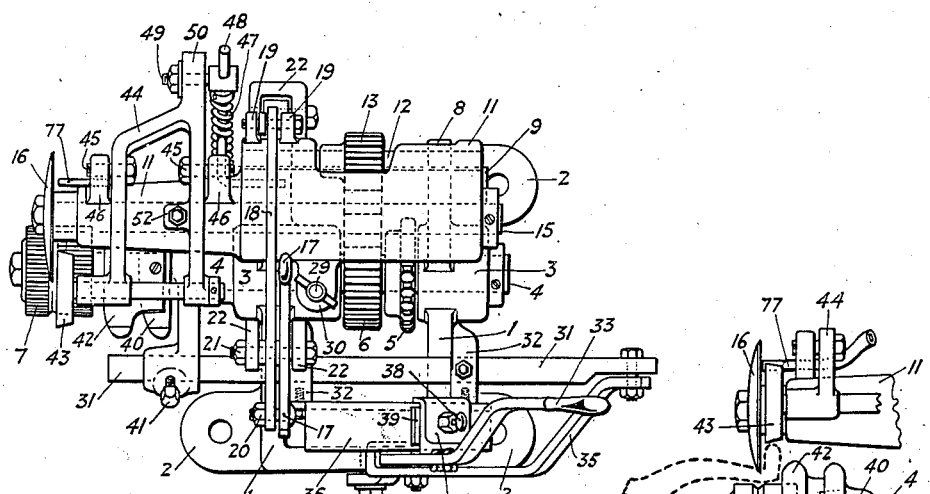
Figure 1 is a plan of the device, viewed from the front.
Figure 3:
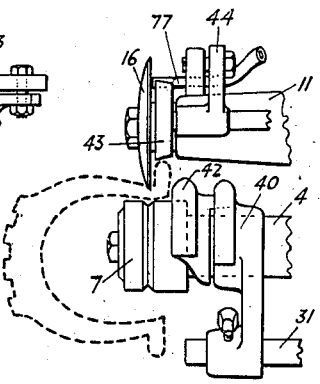
Figure 3 is a fragmentary view, with detail omitted for purposes of clarity, of the cutting end of the device, illustrating the operation of debeading a tire, wherein the tire is indicated in cross-section by an enclosing broken line.
Figure 2:
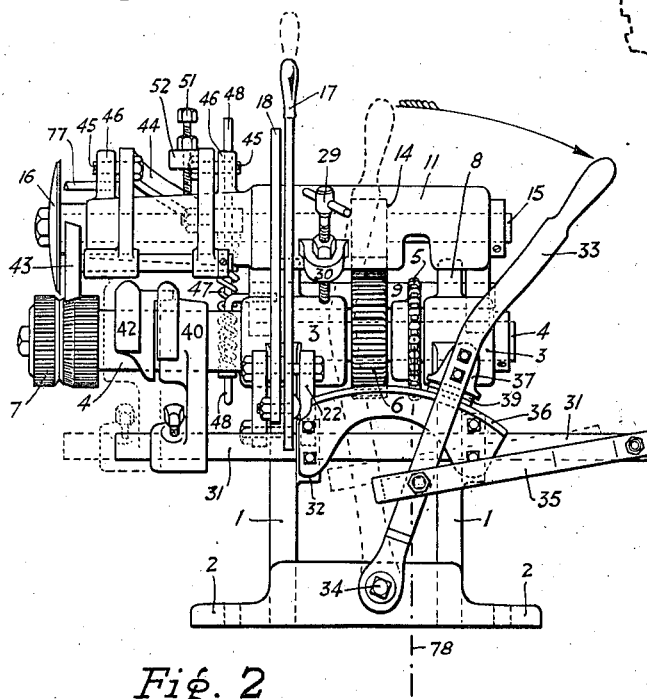
Figure 2 is a front elevation, and in which certain lever movements are indicated by broken lines, extraneous to the parts represented.
Figure 4:
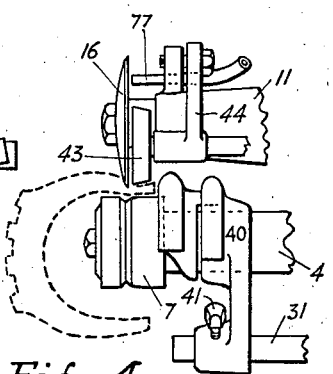
Figure 4 is a view similar to Figure 3 and in which a debeaded tire is shown being cut into strips.

In operation, the cutting of a pneumatic tire is now described as follows (see Figures 3, 4 and 9).

A tire is placed around the machine; that is, as a hoop would be placed over a peg, the cutting blade raised from the feed roller by movement of the lever 17; the width of material gauged by movement of the lever 33; the cutting blade brought in contact with the tire and the tire permitted to rotate until the bead has been cut therefrom, after which the bead is removed, the tire turned over and the other bead removed in a like operation (Figure 3); then the tire is reinserted and a side wall cut into a single strip. As the tire rotates, it will feed spirally to the cutter, support to the tire being provided by trunnion rollers placed radially to the machine on the circle described by the tire. Likewise the other side wall; then the face of the tire is fed over the feed rollers, vertically depending therefrom and cut into a strip.

After sufficient material has been cut into strips, the gauge 40 is removed and the splitting attachment mounted to the machine and the rubber strips re-fed on edge to the cutter blade (Figure 9), whereby the rubber will be split from the fabric base.

Another use for strips of rubber cut in this fashion is in the manufacture of rubber mats.

I am aware that prior to my invention cutting machines having rotary cutting blades and milled feed rollers have been made, but my invention differs from all such, and while I have shown and described the preferred embodiment of this novel device, it is to be understood that the precise construction disclosed may be changed or modified and I reserve the right to all changes and modifications coming within the scope of the invention as defined in the appended claims.

I claim:

1. In a cutting machine the combination comprising, a base as means to support rotating and hinged members, levers in engagement therewith; brackets integral with said base as means to support therethrough a sliding bar, adapted to have in adjustably fixed position a gauge member secured thereto, and said brackets adapted to have secured also thereto, a friction plate as means to control and set a lever adapted as means to actuate a sliding bar supporting said gauge and said gauge adapted to sliding and adjustable engagement with a feed roller, as means to alter cutting widths of material passing over said feed roller, said gauge member adapted to have a gauge extension secured thereto for the purpose of added gauging means; a lever, fulcrumed to said base, having a connecting link as means to connect said lever to said sliding bar; a breaking member fixed to said lever, said breaking member in sliding engagement with a friction plate and having in threaded engagement therewith set screws adapted to expand a break shoe against said friction plate, as means to control the movement of said lever, and a set screw in threaded engagement with a bracket integral with said base adapted to biting engagement with said slide bar, as means to lock said bar against sliding movement while heavy material having a tendency to move the hereinbefore claimed gauge, is being cut, substantially as set forth.

2. In a cutting machine the combination comprising, a base having a hinged member supporting a gear train and a circular cutting blade in hinged engagement therewith, said hinged member adapted to movement by means of an automatically locking and unlocking lever adapted as means to engage and disengage said circular cutting blade with material passing over a feed roller, said lever fulcruned upon an adjustable member comprising a fork pivotally secured to one of the standards of the base of the machine, said fork having an adjusting bolt flexibly secured to one end thereof in engagement with a lug integral with said standard, and nuts in threaded engagement therewith as means to adjust said fork, for the purpose of altering the relative position of the fulcrum point of said lever; said lever having an offset pivotal connection with a connecting link connecting said lever to the hinged member supporting a cutting blade, as means to lock and unlock said lever in locking and unlocking engagement by reason of said pivotal connection being adapted to movement through an arc past a line of dead centre, concentric with the fulcrum of said lever, and means to limit said movement; said adjustment of said fulcrum adapted as means to adjust the movement of said hinged member supporting the cutting blade for the purpose of compensating for wear upon said cutting blade, and as means to alter the throw of said hinged movement, substantially as set forth.

3. In a cutting machine having a hinged member supporting a circular cutting blade; a lug integral with said hinged member having a set screw passing therethrough in threaded engagement therewith adapted to stopper connection with the base of said cutting machine as means to prevent abrasive contact of said cutting blade with a feed roller, a coil spring mounted in tension and having connection between said hinged member and the lever fulcrum fork, as means to nullify gravitational pull upon, and hold in disengaged position said hinged member, substantially as set forth.

4. A cutting machine having a hinged member in which rotates a shaft carrying a cutting blade, provided with a spring controlled pressure roller mounted thereto, adapted as means to hold to, and control the width of material passing over a feed roller in engagement therewith; said pressure roller comprising a roller, having a tapered face complementary to the tapered portion of the feed roller, integral with a shaft bearing in a yoke arm pivotally fulcrumed to lugs positioned upon said hinged member, said yoke having a lever terminus to which is secured pivotal means adapted to slidable engagement with an offset rod having a coil spring mounted thereon, said rod having an offset terminus in engagement with a recess in the end of the hinge shaft of the hinged member and said coil spring adapted to exert lever pressure against said yoke lever terminus, for the purpose of imparting pressure through said roller, as means to hold material against said feed roller, said yoke having a set screw in connection therewith for the purpose of preventing abrasive contact of said pressure roller with said feed roller, substantially as set forth.

5. In a splitting attachment to a cutting machine having supporting means integral with the housing; a sill comprising said supporting means adapted to have in spring-controlled and slidable engagement therewith a base supporting a yoke, having a box-bearing pivotally mounted thereto, in which rotates an auxiliary pressure roller characterized by annular ribs or spiral grooves as means to resist upward pull upon the material being split, said pressure roller adapted to swinging movement transversely to its axis as means to equalize pressure and said roller having lever-actuated spring-controlling means comprising a coil spring mounted upon a rod integral with an offset arm laterally and downwardly extending from said sliding base pivotally engaging with a lever fulcrumed to said sill, said rod bearing in lugs integral with said protruding sill, and said coil spring adapted to adjustment by means of a nut in threaded engagement with said rod, for the purpose of altering and adjusting pressure imparted through said pressure roller upon a strip of material being cut, substantially as set forth.

6. Alternative means in a splitting attachment for a cutting machine, comprising a flanged and recessed hub, as means to impart traction and aid in the propulsion of material being fed to a cutting member, said flanged hub having a recess of a diameter adapted to pass over and about a feed roller in telescopic endwise and slidable engagement, said flange of said hub adapted as traction means actuated by slidably splined engagement with a rotating mandrel, said hub having an annular groove as race means rotatably engaging with race pins set in the housing of said splitting attachment, as means to impart endwise movement for the purpose of gauging splitting widths of material being split and said flange of said hub having a milled or otherwise irregularly marked face perpendicular to the rotating axis as further means to impart traction, substantially as set forth.

7. A flexible track as auxiliary traction means supplanting an auxiliary feed roller, said track adapted to engagement with driving means and said driving means comprising a bevel gear in slidable engagement with a driver element, said gear rotatably engaging with and reposing within a housing, as means to impart slidable endwise movement to said gear, said housing supporting a crown gear in engagement with a sliding bevel gear and a fixed bevel gear, said fixed gear in engagement with a shaft having bearing means supporting said flexible track and said flexible track adapted as means to impart traction and aid in the propulsion of material passing over a feed roller, and to gauge cutting widths of material being split or cut, substantially as set forth.

8. In a splitting attachment, the combination with a cutting machine having a rotatable feed roller and rotatable cutting blade disposed in co-acting relation thereto, of an auxiliary feed wheel having a serrated face perpendicular to its axis, means connecting the shaft of said feed wheel to the shaft of the feed roller of the cutting machine for imparting movement to said feed wheel, a pressure roller slidably mounted in opposed relation to the serrated face of said auxiliary feed wheel, a lever for moving said pressure roller from the auxiliary feed wheel, and spring tensioning means normally holding said pressure roller in operative position.

9. In a splitting attachment, the combination with a cutting machine having a rotatable feed roller and rotatable cutting blade disposed in co-acting relation thereto, of an auxiliary feed wheel having a serrated face perpendicular to its axis, means connecting the shaft of said feed wheel to the shaft of said feed roller of the cutting machine for imparting movement to said feed wheel, a pressure roller, a yoke pivotally supporting said roller for swinging movement transversely to its axis, a base integral with said yoke slidably mounted for moving said pressure roller towards and from said auxiliary feed wheel, spring means normally moving said pressure roller towards said auxiliary feed wheel, and a lever for moving said pressure roller away from said auxiliary feed wheel.

10. In a splitting attachment, the combination with a cutting machine having a rotatable feed roller and rotatable cutting blade disposed in co-acting relation thereto, of an auxiliary feed wheel having a serrated face perpendicular to its axis, means connecting the shaft of said feed wheel to the shaft of the feed roller of the cutting machine for imparting movement to said feed wheel, pressure dogs pivotally mounted in opposed relation to said auxiliary feed wheel, and spring means normally moving said pressure dogs towards said feed wheel.

11. In a splitting attachment, the combination with a cutting machine having a rotatable feed roller and rotatable cutting blade disposed in co-acting relation thereto, of an auxiliary feed wheel consisting of a recessed hub slidably mounted on the mandrel of the feed roller and adapted to be moved into telescopic engagement with the feed roller, splines connecting said hub with the mandrel, a flange at the outer end of said hub having its outer face milled, and a slidable housing surrounding said hub having connection therewith.

12. In a splitting attachment, the combination with a cutting machine having a rotatable feed roller and rotatable cutting blade disposed in co-acting relation thereto, of an endless belt, a housing supporting said belt in parallel relation to the feed roller and slidably mounted on the mandrel of the feed roller to move said belt towards and from the feed roller, and a train of gearing carried by said housing for connecting said belt to the mandrel of the feed roller for driving said belt.

13. A cutting machine comprising a rotatable mandrel, a feed roller mounted on said mandrel, a rotatable cutter disposed in co-acting relation to said feed roller, auxiliary feed means mounted for movement towards and from said feed roller, and means operatively connecting said auxiliary feed means with said mandrel for driving the auxiliary feed means.

CARL HALMRAST.